Nov. 20, 1962 T. T. BUTLER 3,064,890

PARALLEL INPUT FAST CARRY BINARY COUNTER WITH FEEDBACK RESETTING MEANS

Filed May 29, 1961 2 Sheets-Sheet 1

INVENTOR
T. T. BUTLER
BY Lucian C. Canepa
ATTORNEY

Nov. 20, 1962

T. T. BUTLER 3,064,890

PARALLEL INPUT FAST CARRY BINARY COUNTER
WITH FEEDBACK RESETTING MEANS

Filed May 29, 1961

2 Sheets-Sheet 2

INVENTOR
T. T. BUTLER

BY Lucian C. Canepa

ATTORNEY

United States Patent Office 3,064,890

Patented Nov. 20, 1962

3,064,890

PARALLEL INPUT FAST CARRY BINARY COUNTER WITH FEEDBACK RESETTING MEANS

Thomas T. Butler, Morristown, N.J., assignor to Bell Telephone Laboratories, Incorporated, New York, N.Y., a corporation of New York Filed May 29, 1961, Ser. No. 113,433
6 Claims. (Cl. 235—92)

Figure 1:
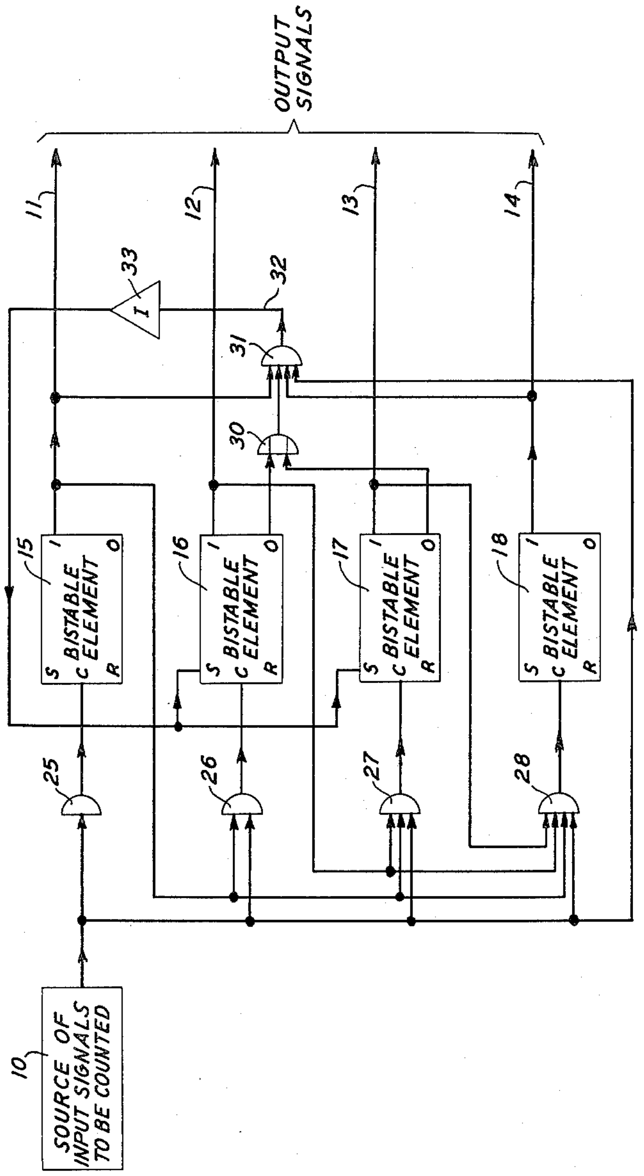

This invention relates to the counting of electrical signals, and more particularly to a high-speed variable-base counting circuit.

The concept of interconnecting $n$ bistable elements to form a modulo N counting circuit, where N is not equal to an integral power of 2 and $2^n$ is greater than N, is known. Such a circuit responds to the application thereto of a sequence of electrical signals by counting in a normal binary progression from 0 to $N-1$ and then recycling back to 0. In this mode of operation $2^n-N$ stable states of the bistable elements are not utilized. Typically, these unused stable states are effectively nullified by providing feedback connections among the bistable elements to cause the circuit to recycle after reaching the count of $N-1$.

Modulo N counting circuits of the type specified above are, for example, described in "Arithmetic Operations in Digital Computers," R. K. Richards, pages 199–202, D. Van Nostrand, 1955. The modulo N counting circuits described in the noted pages are all of the so-called slow carry type. In this type of circuit a plurality of bistable elements are respectively interconnected with a plurality of series-arranged AND gates and input signals to be counted are applied only to the first one of the series-arranged gates. The cited book and other known references pertinent to the counting art do not, however, suggest extending the principles set forth above to the formation of a modulo N counting circuit of the so-called fast carry type. In this type of relatively high-speed counting circuit, a plurality of bistable elements are respectively interconnected with a plurality of AND gates and input signals to be counted are simultaneously applied to every gate. A typical modulo $2^n$ fast carry counting circuit is shown in FIGS. 7–3 on page 195 of the cited Richards book.

In a slow carry counting circuit, it is a relatively straightforward matter to connect the feedback arrangement to the elements in such a manner that reliable modulo N counting operation is achieved, for the bistable elements operate one at a time and in an ordered sequence. However, in a fast carry modulo N counting circuit in which all the bistable elements may operate almost simultaneously, it is a difficult problem to provide a feedback arrangement which ensures highly reliable operation of the circuit regardless of which elements thereof happen to operate first in a particular counting cycle.

An object of the present invention is the improvement of counting circuits.

More specifically, an object of this invention is a modulo N counting circuit of the fast carry type.

Another object of the present invention is a high-speed variable-base counting circuit which is characterized by a high degree of reliability in its mode of operation and, additionally, by extreme simplicity of design.

These and other objects of the present invention are realized in a specific illustrative embodiment thereof which comprises a fast carry counting circuit including a feedback arrangement that responds to the leading edge of the Nth input signal to be counted and to the bistable elements of the circuit being in states representative of the count $N-1$ to switch the elements to states representative of an intermediate false count of $2^n$, whereby each of the bistable elements then responds to the trailing edge of the Nth input signal by switching to a "0" representation. In this way the illustrative embodiment is made to count in sequence from 0 to $N-1$ and then to recycle back to 0.

The feedback arrangement of the illustrative counting circuit comprises an OR gate whose inputs are respectively derived from the bistable elements which represent "0's" in the count of $N-1$. Specifically, the OR gate is connected thereto in such a manner that whenever any one or more of these bistable elements are representative of a "0," a signal appears at the output of the OR gate.

The feedback arrangement of the counting circuit also includes an AND gate some of whose inputs are respectively derived from the bistable elements which represent "1's" in the count of $N-1$. Additionally, this AND gate receives as inputs thereto both the signals to be counted and the output of the OR gate. In turn, the output of the AND gate is applied to an inverter.

Thus, whenever the bistable elements of the counting circuit represent a count of $N-1$, the AND gate is primed. As a result, the AND gate responds to the leading edge of the next or Nth input signal to be counted by supplying a signal to the inverter. The output lead of the inverter is connected to the Set terminal of every bistable element which represents "0" in the count of $N-1$. Consequently, in response to the leading edge of the Nth input signal, the bistable elements of the circuit are switched to an all-one or $2^n$ count.

During the time in which the Nth input signal to be counted is applied to the illustrative counting circuit, the OR gate included in the feedback arrangement thereof ensures that the AND gate continues to supply an output signal even if some of the bistable elements connected to the OR gate are set more quickly than others. In other words, until the last bistable element is switched from a "0" to a "1" representation, the OR gate continues to provide an input signal to the AND gate. Hence, the illustrative circuit exhibits a nonracing characteristic, i.e., it is immaterial whether the bistable elements of the circuit are set simultaneously or whether some elements are set more quickly than others.

Finally, in response to the trailing edge of the Nth input signal to be counted, the bistable elements are switched from the all-one representation to an all-zero indication and the illustrative circuit is then ready to respond to the $(N+1)$th and subsequent input signals by again counting in sequence from 0 to $N-1$.

It is a feature of the present invention that a fast carry counting circuit include a feedback arrangement which responds to the bistable elements of the circuit being in states representative of the count $N-1$ and to the leading edge of the Nth input signal to be counted by supplying an output signal to set the elements to an all-one representation, whereby the elements then respond to the trailing edge of the Nth input signal by switching to an all-zero indication.

It is another feature of the present invention that a fast carry counting circuit include a feedback arrangement comprising an OR gate responsive to the state of each bistable element that represents a "0" in the count of $N-1$, and further comprising an AND gate responsive to (1) the state of each bistable element that represents a "1" in the count of $N-1$, (2) the output of the OR gate, (3) the input signals to be counted, the output lead of the AND gate being connected to an inverter whose output in turn is connected to the Set terminal of every bistable element which represents a "0" in the count of $N-1$.

Figure 2:
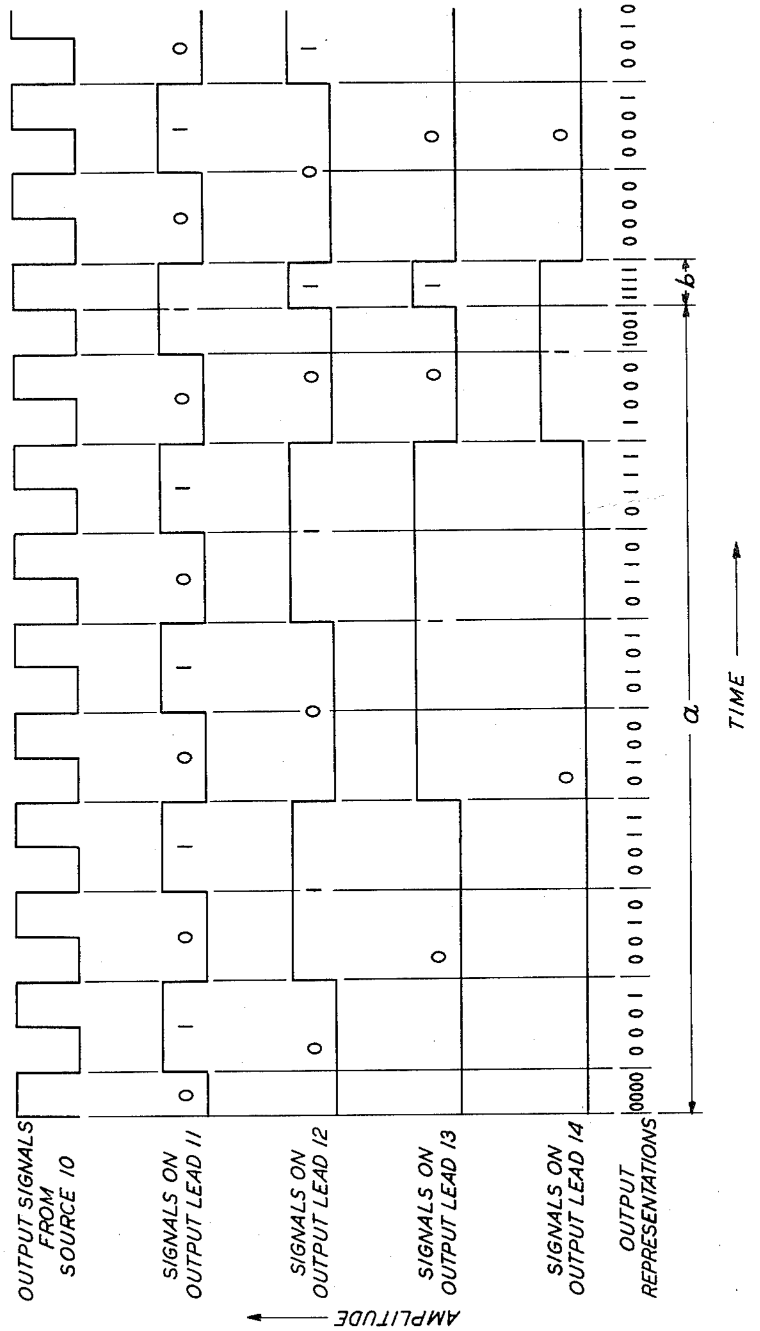

A complete understanding of the present invention and of the above and other features and advantages thereof may be gained from a consideration of the following detailed description of an illustrative embodiment thereof presented hereinbelow in connection with the accompanying drawing, in which:

FIG. 1 depicts a specific illustrative modulo N fast carry counting circuit made in accordance with the principles of the present invention; and FIG. 2 illustrates various waveforms characteristic of the circuit shown in FIG. 1.

The principles of this invention are presented herein as being embodied in a modulo 10 counting circuit comprising four bistable elements. (Note that the number 10 is not equal to an integral power of 2 and that $2^4$ is greater than 10). However, it is to be clearly understood that these principles are applicable in general to the construction of a modulo N fast carry counting circuit.

Looking at the fast carry counting circuit shown in FIG. 1 from an overall viewpoint, it is seen that the circuit includes a source 10 of input signals to be counted and four output leads 11 through 14 on which appear digital output signals representative of the count of the illustrative circuit.

The circuit of FIG. 1 includes four conventional bistable elements 15 through 18 each of which includes Set, Reset and Common input terminals and 1 and 0 output terminals. By way of background, it is recalled that if the potential of the 1 output terminal of a bistable element is, for example, positive with respect to ground and that of the 0 output terminal thereof is negative, the element may be said to store a "1" representation. Conversely, if the potential of the 1 terminal is negative and that of the 0 terminal is positive, the element may be said to store a "0" representation. Of course, other polarities may be respectively assigned to the "1" and "0" representations.

The application of a signal, for example, a negative-going signal, to the Set terminal of a bistable element of the type shown in FIG. 1 causes the element to switch to or remain at the state thereof which is representative of "1." Similarly, the application to the Reset terminal of such an element of a signal, for example, a negative-going one, causes the element to switch to or remain at the state thereof which is representative of "0." Additionally, the application of a proper signal, say, a negative-going one, to the Common input terminal of such an element causes the state of the element to be complemented, i.e., the element is thereby switched to its other stable state.

Initially, assume that each of the bistable elements 15 through 18 of FIG. 1 is in its "0" state, which may, for example, be achieved by applying signals to the Reset terminals thereof from a suitable source (not shown). As a result, each of the output leads 11 through 14 has initially applied thereto a potential which is representative of a "0" signal. Hence, the initial output representation is 0000. It is noted that the bistable element 15 is to be regarded as the least significant digit element of the counting circuit shown in FIG. 1, and that the element 18 is to be regarded as the most significant digit element thereof.

Respectively associated with the bistable elements 15 through 18 of FIG. 1 are four noninverting AND gates 25 through 28, the output lead of each AND gate being connected to the Common input terminal of its associated bistable element. Each of the AND gates 25 through 28 is connected to receive at one input terminal thereof signals from the source 10. Additionally, each of the AND gates 26 through 28 has applied thereto as inputs the signals which appear at the 1 output terminals of all bistable elements which are less significant than the bistable element with which the gate is associated. Note that the AND gate 25 has only one input lead connected thereto because, as stated above, the bistable element 15 associated therewith is the least significant of the bistable elements of the illustrative counting circuit depicted in FIG. 1.

What has been described so far is a conventional fast carry $2^n$ counting circuit which without the feedback arrangement to be described in detail hereinbelow would respond to signals from the source 10 by cycling in sequence from 0000 to a count of 1111 and then back to 0000. Waveforms characteristic of the mode of operation of such a conventional circuit are shown in the time interval *a* of FIG. 2. It is noted that in this mode of operation the bistable element 15 changes state in response to the negative-going swing of each signal applied to the Common input terminal thereof; that the element 16 changes state in response to the negative-going swing of every other signal applied to its Common input terminal; that the element 17 changes state in response to the negative-going swing of every fourth signal applied to its Common input terminal; and finally, that the element 18 changes state in response to the negative-going swing of every eighth signal applied to its Common input terminal. In this way the representations appearing on the output leads 11 through 14 of FIG. 1 progress in normal binary sequence from 0000 to 1001, as indicated in FIG. 2.

The novel feedback arrangement of the modulo 10 counting circuit shown in FIG. 1 includes an OR gate 30 and a noninverting AND gate 31. In general, the inputs to the OR gate 30 of a modulo N counting circuit made in accordance with the principles of this invention are derived from the 0 output terminals of all bistable elements which represent "0's" in the count of $N-1$. For a modulo 10 circuit, $N-1$ equals 1001, which, reading the digits from right to left, are respectively represented by the states of the bistable elements 15 through 18 of FIG. 1. Accordingly, the inputs to the OR gate 30 of the specific circuit shown in FIG. 1 are the signals which appear at the 0 output terminals of the bistable elements 16 and 17.

Thus, when the bistable elements 15 through 18 of the illustrative circuit depicted in FIG. 1 are representative of the count 1001, the OR gate 30 supplies an output signal, for example, a relatively positive potential, to one input terminal of the four-input terminal AND gate 31. Other inputs to the AND gate 31 are derived from the 1 output terminals of all bistable elements which represent "1's" in the count of $N-1$. For a modulo 10 circuit, these additional inputs to the gate 31 are the signals which appear at the 1 output terminals of the bistable elements 15 and 18. The fourth input terminal of the AND gate 31 is directly connected to the output of the source 10 of signals to be counted.

Hence, when the bistable elements 15 through 18 of FIG. 1 are representative of the count 1001, the AND gate 31 is primed to pass therethrough the next or Nth signal from the source 10. The positive-going or leading edge of this next signal appears on output lead 32 of the AND gate 31 and after passing through inverter 33 is applied as a negative-going signal to the Set input terminals of the bistable elements which represent "0's" in the count of $N-1$, specifically, for the illustrative modulo 10 circuit, to the bistable elements 16 and 17, thereby setting the elements 15 through 18 to an intermediate false count of 1111 during the time interval marked *b* in FIG. 2.

Thus, the counting circuit shown in FIG. 1 represents the count 1111 at the time when the negative-going or trailing edge of the Nth input signal is applied thereto. In response to this trailing edge, the bistable elements 15 through 18 of the circuit are switched to the representation 0000. Accordingly, if a suitable utilization circuit (not shown) is connected to the leads 11 through 14 of FIG. 1 to sample the output signals of the illustrative counting circuit at instants which are interleaved between the signals from the source 10, it would appear to such a utilization circuit that the count of the bistable elements 15 through 18 had progressed in sequence from 1001 to 0000.

As noted above, the bistable elements 16 and 17 respond to the signal which is applied from the inverter 33 to their respective Set terminals by switching from "0" to "1" representations. The elements 16 and 17 may so switch in exact unison or, as is more likely, one element will change its state before the other. Regardless, however, of which of the elements 16 and 17 switches first, the OR gate 30 continues to supply a signal to the AND gate 31 until both elements are in their "1" states. Thus, the feedback arrangement included in the circuit shown in FIG. 1 does not introduce any race conditions into the cycle of operation thereof, it being completely immaterial to the reliability of the circuit whether the elements 16 and 17 change their states simultaneously or in sequence.

It is to be understood that the AND gate 31 of the specific illustrative modulo 10 counting circuit shown in FIG. 1 may be of the inverting type. In such a case the inverter 33 may, of course, be omitted from the depicted circuit. Alternatively, each bistable element included in the counting circuit may be of a type which responds to a positive-going signal applied to its Set input terminal but to a negative-going signal applied to its Common input terminal. In this case the inverter 33 may be omitted and the AND gate 31 may be of the noninverting type.

Furthermore, it is noted that the AND gates 25 through 28 shown in FIG. 1 may be of the inverting type, in which case the signals supplied by the source 10 would have to be negative pulses rather than positive pulses of the type depicted in the top row of FIG. 2.

Also, it is to be noted that the one-input AND gate 25 may be omitted from the FIG. 1 circuit if the gate 25 is not needed to perform an inversion function. Moreover, if a particular modula N fast carry counting circuit, only one of the bistable elements thereof represents "0" in the count of $N-1$, it would clearly not be necessary to include the OR gate 30 in the feedback arrangement to guard against the occurrence of race conditions. In that case the 0 output terminal of the one element would be directly connected to one input terminal of the AND gate 31.

Additionally, it is to be understood that the above-described arrangements are illustrative of the application of the principles of the invention. Numerous other arrangements may be devised by those skilled in the art without departing from the spirit and scope of the invention.

What is claimed is:

1. In combination in a fast carry modulo N counting system, where N is not equal to an integral power of 2, $n$ bistable elements, where $n$ is greater than $\log_2 N$, means interconnecting said elements and responsive to the occurrence of input signals to be counted for switching said elements in a normal binary progression from an indication representative of a count of 0 to one representative of $N-1$, and means responsive to said elements being in states represenative of the count $N-1$ and to the occurrence of the leading edge of the Nth input signal to be counted for setting said elements to an all-one indication, whereby said elements respond to the occurrence of the trailing edge of the Nth input signal to be counted by switching to an all-zero indication.

2. A combination as in claim 1 wherein said setting means includes an OR gate which is responsive to the output conditions of only those of said bistable elements which represent "0's" in the count of $N-1$, and AND gate which is responsive to (1) the output of said OR gate, (2) input signals to be counted, and (3) the output conditions of only those of said bistable elements which represent "1's" in the count of $N-1$, and electrical path means connecting the output of said AND gate to the Set terminal of each one of said bistable elements which represents a "0" in the count of $N-1$.

3. A combination as in claim 2 wherein said AND gate is of the inverting type and said electrical path means consists of a direct electrical connection.

4. A combination as in claim 2 wherein said AND gate is of the noninverting type and said electrical path means includes an inverter.

5. In combination, a fast carry counting circuit including $n$ bistable elements which are responsive to signals from a source of input signals to be counted by progressing in a normal binary sequence from 0 to $N-1$, where N is not equal to an integral power of 2 and $2^n$ is greater than N, and a feedback arrangement including means for responding to the elements of said circuit being in states representative of a count of $N-1$ and to the occurrence of the leading edge of the Nth input signal to be counted by switching said elements to an all-one representation, whereby the elements then respond to the occurrence of the trailing edge of the Nth signal to be counted by switching to an all-zero representation.

6. In combination in a fast carry modulo N counting circuit which includes $n$ bistable elements, where N is not equal to an integral power of 2 and $2^n$ is greater than N, a feedback arrangement comprising first means responsive to the output conditions of only the ones of said elements that represent "0's" in the count of $N-1$ for providing a gating signal whenever at least one of the elements to which said first means is responsive is representative of a "0," and second means responsive to (1) the gating signal output of said first means, (2) the occurrence of the leading edge of the Nth input signal to be counted, and (3) said elements being representative of the count of $N-1$, for providing a signal to set said elements to an all-one representation, whereby said elements then respond to the occurrence of the trailing edge of the Nth input signal to be counted by switching to an all-zero representation.

No references cited.